Figure 1:
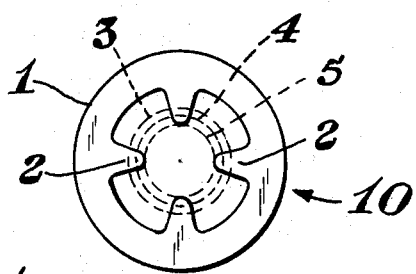

United States Patent

[11] 3,581,776

| [72] | Inventor | James P. Sheahan<br>Midland, Mich. |
|---|---|---|
| [21] | Appl. No. | 764,416 |
| [22] | Filed | Oct. 2, 1968 |
| [45] | Patented | June 1, 1971 |
| [73] | Assignee | The Dow Chemical Company<br>Midland, Mich. |

[54] PIPE INSULATION STRUCTURE
3 Claims, 5 Drawing Figs.

[52] U.S. Cl. ............................................. 138/108,
 138/178
[51] Int. Cl. ......................................... F16l 59/12
[50] Field of Search ........................................ 138/103,
108, 113, 115, 178

[56] References Cited
UNITED STATES PATENTS

| 340,740 | 4/1886 | Suhr | 138/113 |
| 1,813,995 | 7/1931 | Henshaw | 138/103 |
| 2,409,304 | 10/1946 | Morrison | 138/113X |
| 2,782,251 | 2/1957 | Ebel | 138/Cellular Digest |
| 2,849,028 | 8/1958 | Clark et al. | 138/Cellular Digest |

FOREIGN PATENTS

| 1,009,949 | 6/1957 | Germany | 138/Cellular Digest |
| 376,328 | 5/1964 | Switzerland | 138/113 |
| 641,090 | 8/1950 | Great Britain | 138/129 |

Primary Examiner—Herbert F. Ross
Attorneys—Griswold and Burdick, Richard G. Waterman and Lloyd E. Hessenaur, Jr.

ABSTRACT: A flexible insulation structure for pipes, tubing and the like having a constant outer diameter and inwardly directed projections from its inner surface which permit the positioning of pipes of varying diameter within the structure.

PATENTED JUN 1 1971  3,581,776

INVENTOR.
James P. Sheahan
BY
Sidney J. Walker
ATTORNEY

PIPE INSULATION STRUCTURE

This invention relates to insulation for tubular-shaped vessels such as pipes and the like and more particularly to such insulation which is adaptably shaped to receive such vessels having varying diameters.

Flexible insulation materials commercially used today for condensation control are made generally of foam rubber materials such as neoprene, vinyl or butyl rubber. They generally consist of tubing from 6 to 50 feet in length, in thickness of one-fourth inch, one-half inch and three-fourths inch and for pipe diameters ranging from three-eighths inch to 6 inches. The shape of this tubing is formed by two concentric ring surfaces forming an inside and outside diameter. The inside diameter is generally of a size to fit snugly on the pipe whereby the pipe is supported concentrically by the tubing to give a constant insulative value. These tubings may be slit to permit installation on site or not. They are difficult to install because of the tight fit required and sometimes need a dry lubricant to make them easier to slip into the pipe. Tolerances of the tubings, especially the inside diameter tolerance has to be fairly close to insure good support and a fairly constant insulative value. As the pipes to be insulated come in a variety of sizes and materials, many sizes of insulative tubing are required. For example, today in the condensation control area of pipe coverings, 66 sizes are required. This large number is required because of the variance of inside diameter required for both iron pipe and copper tubing. The sizes are particularly selected so that not only do they fit each of the pipes used in the industry, but also serve as sleeves to fit over the smaller sized insulations for the completion of fittings.

I have found that by selecting a cross section of variable diameter for the inside annular opening of a flexible pipe insulation with an outside shape based upon a constant diameter, unexpected and highly beneficial results are obtained.

An object of this invention therefore is to provide a flexible insulation structure having a variable inner diameter capable of use with pipes, tubing and the like of varying outer diameters. A further object of this invention is to provide a flexible insulation structure which reduces the requirement for close tolerances in the fit of said structure to the pipe or tubing that it insulates. Yet another object of this invention is to provide a flexible insulation structure having a reduced bearing area at its inner surface to facilitate installation. Another object is to eliminate the need of a lubricant in the fitting of a flexible insulated structure into pipe, tubing, or the like. Another object is to reduce the amount of material in a flexible insulation structure needed for most sizes of pipes or tubing which are insulated by said structure. Other objects and advantages of this invention will be apparent to one skilled in the art upon reading the following description and claims, reference being had to the accompanying drawings forming a part of this specification wherein:

FIG. 1 is a cross-sectional view of one embodiment of a flexible insulation structure in accordance with the invention, wherein said structure is generally designated by numeral 10. The principal wall thickness 1 has a plurality of projections 2 projecting equiangularly and concentrically toward the center thereof. Broken line circles 3, 4 and 5 are intended to depict pipes or tubings of various size each of which can individually be fitted within structure 10 and be firmly positioned in said structure by projections 2 so as to be afforded the same insulative protection throughout their diameter by means of the insulative value of homogeneous wall 1 and, in the case of the smaller pipes or tubings, the combination of the projections and air space plus the homogeneous wall.

Figure 2:
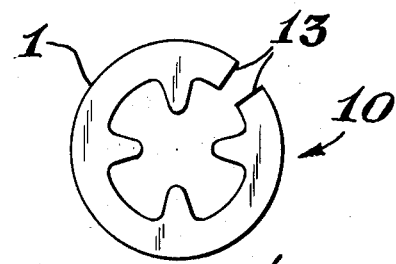

FIG. 2 is a cross-sectional view of the embodiment shown in FIG. 1 except that it is slit to permit application of the insulative material to a pipe in situ. Shown also is adhesive 13 on both sides of the slit to permit joinder of the insulative material. Such joinder can be effected by tape, adhesive sealers and other means well known in the art.

Figure 3:
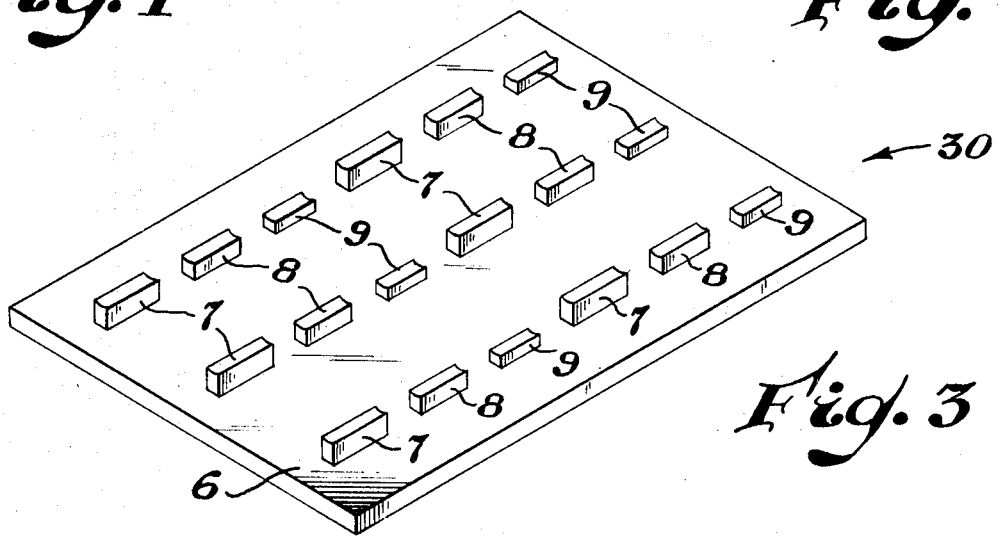

FIG. 3 is an isometric view of yet another embodiment of the invention wherein the structure is generally designated by numeral 30, wherein 6 is a flat sheet of flexible insulative material having projections or fingers 7, 8 and 9 of varying sizes, wherein each set of projections 7, 8 or 9 are equal in length and on the same axial plane.

Figure 4:
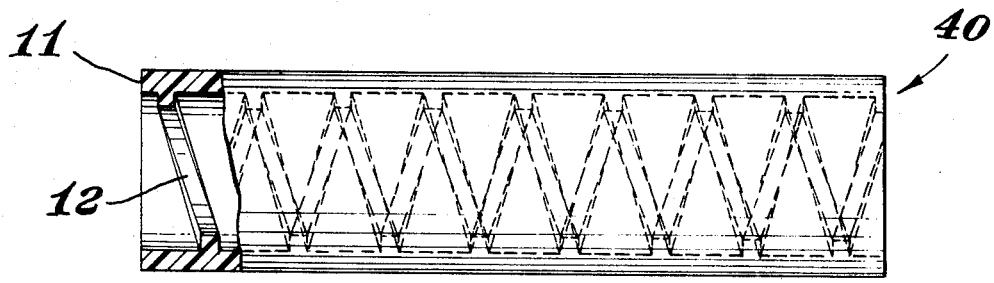

FIG. 4 is an isometric view of yet another embodiment of the invention generally designated by numeral 40 wherein the principal wall thickness 11 has an inwardly directed spiralled projection 12.

Figure 5:
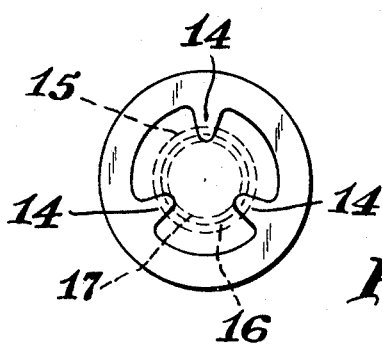

FIG. 5 is a cross-sectional view of yet another embodiment showing a different configuration of the projections, having three projections 14 within which at least three pipes of different diameters may be fitted as depicted by broken lines 15, 16, and 17.

As can be seen, the embodiments of the invention can be integral hollow tubes having inwardly diverted projections as in FIGS. 1, 4, and 5, they can be slit longitudinally to permit installation in pipes already in place as in FIG. 2, and they can be in the form of a flexible flat sheet having flexible projections projecting from one surface thereof as in FIG. 3 for installation in pipes in place with the use of adhesives, tape, clamps and other means well known in the art. The flat sheet is simply rolled around the pipe to be insulated with the projections facing the outer diameter of the pipe. The projections may be continuous through the length of the structure as in FIGS. 1, 2, 4, and 5, they may be segmented as in FIG. 3, they may be in spiral form as in FIG. 4, they may be equal in depth as in FIGS. 1, 2, 4, and 5, or they may be a series of varying depth as in FIG. 3. They must in all cases be configured as to substantially center the pipe within the insulative structure so as to provide equal insulation to all the pipe surface.

The material from which the insulative structure is made in accordance with the present invention may be neoprene, vinyl or butyl rubber as is presently widely used, or it may be a flexible polymeric foam such as foamed polyethylene and other polymer foams. The invention is not restricted to any particular type of material provided the material has sufficient flexibility and strength to give the inserted pipe or tubing good supportive contact with the projections, and, further, the material must provide he necessary insulation. On balance, the polyolefinic foams are preferred. Polyolefinic foams such as polyethylene are of good quality and of low cost. They can be configured into ideal cross sections, they are flexible and easily compressed, they have good high and low temperature resistance, they have good resistance to oil, gasoline and solvents, they are lightweight, nonstaining, easy to install and more economical to produce than the rubbers.

The aliphatic olefin polymers which can be employed in making the insulative structures in accordance with the invention can be normally solid polymers obtained by polymerizing aliphatic mono-olefins such as ethylene, propylene, butene-1, pentene-1, 3-methylbutene-1, 4-methylpentene-1, 4-methylehexene-1, or 5-methylhexene-1, alone or with one another, or with various other polymerizable compounds. The polymers of ethylene or propylene alone are excellent because they produce tough, resilient and fine celled chemically inert products. Examples of suitable polymerizable organic compounds which can be polymerized with ethylene or propylene are acrylic acid, vinyl acetate, methyl methacrylate, tetrafluoroethylene or acrylonitrile copolymers containing in chemically combined form a predominant amount, e.g., 90 percent by weight, or more, of ethylene or propylene with not more than 10 percent of one or more of such other polymerizable compounds, can be used. Other polymers which may be employed in accordance with the present invention are those ionic hydrocarbon polymers described in U.S. Pat. No. 3,264,272.

The structures may be extruded with the use of a suitably shaped mandrel to give the desired inner projections or they may be cast, molded or stamped in sheet form to make an embodiment as for example in FIG. 3. They may be slit during the extrusion process for use in situ or they may be slit later at the site.

Where a configuration of the invention as shown in FIGS. 1 and 5 is used, straight lengths of the structure are merely slid over any straight pipe to be insulated, care being taken that the outer diameter of the pipe to be covered is no larger than the diameter of the inner wall of the structure and no smaller than the diameter formed by the inner tips of the longitudinal inwardly projecting ridges 2 and 14 respectively. This assures that the pipe is held concentrically in position and at the same time receives at least the insulative value of the inner wall of the structure. On the other hand, the smallest pipe which can be utilized in any case (one that is held in position by the tips of the longitudinal inwardly projecting ridges) gets the benefit of additional insulation at no greater structure material cost. This is of course limited in that the length of the inward projections should be no longer than to reduce the value of the air space as an insulator equal to the material used to make the structure. That is, the depth of the projections from the inner wall to the smallest pipe being held thereby should not be greater than a thickness of the material that is equal to a thermal conductance of 1.2 B.t.u./hour foot$^2$ °F. (the value of an air space). This allows a constant insulation value, regardless if the path through the cross section is the homogeneous surface or a combination of material and air space. For example, the thermal resistance factor of foamed polyethylene having a density of about 2 pounds per cubic foot is very close to the thermal resistance of a dead air space. Dead air has a resistance factor of 0.85 for spaces that vary from one-fourth inch to 4 inches. This means that if the foam material is replaced with an air space the material can be removed until a resistance factor of 0.85 is reached. Therefore, ¼-inch depth of foamed polyethylene can be removed and replaced with a ¼-inch air space. For elbow joints and other curved portions of pipe, either the straight lengths may be used where the material of the structure is flexible enough, or special sections may be molded and slit to fit in situ.

It is to be understood that the examples given herein are illustrative rather than restrictive and that numerous modifications of the invention can be made without departing from it.

I claim:

1. An insulative structure particularly suited for use on pipe of at least two different sizes, the structure comprising flexible polymer foam, said structure being a hollow tube, the tube having an inner wall, the inner wall having a plurality of flexible projections inwardly projecting toward the center whereby pipes having varying outer diameters may be positioned concentrically within said insulation, said outer diameters being less than the diameter of said inner wall and large enough to contact said projections, wherein said projections are individual sets of fingers, the fingers in each set of substantially the same length, equally spaced, and in the same axial plane, each set of fingers being equal in length to at least one other set of fingers.

2. The structure of claim 1 made of foamed polyethylene.

3. The structure of claim 1 wherein the depth of the projections from said inner wall to a pipe of smallest diameter capable of being positioned thereby is no greater than the depth of the material that is equal to the thermal conductance of air.